US008777550B2

(12) United States Patent
Pettersson (10) Patent No.: US 8,777,550 B2
(45) Date of Patent: Jul. 15, 2014

(54) ZERO VELOCITY STACKING DEVICE

(76) Inventor: Niklas Pettersson, Sandy, UT (US)

( * ) Notice: Subject to any disclaimer, the term of this patent is extended or adjusted under 35 U.S.C. 154(b) by 611 days.

(21) Appl. No.: 13/000,614

(22) PCT Filed: Jul. 2, 2009

(86) PCT No.: PCT/US2009/049602
§ 371 (c)(1),
(2), (4) Date: Apr. 4, 2011

(87) PCT Pub. No.: WO2010/003107
PCT Pub. Date: Jan. 7, 2010

(65) Prior Publication Data
US 2011/0171002 A1 Jul. 14, 2011

Related U.S. Application Data

(60) Provisional application No. 61/078,073, filed on Jul. 3, 2008.

(51) Int. Cl.
*B65H 29/36* (2006.01)
*B65H 29/26* (2006.01)

(52) U.S. Cl.
USPC ............... 414/794.4; 414/794.2; 271/191

(58) Field of Classification Search
USPC ......... 271/190–191, 201, 73; 414/788, 790.5, 414/792.7, 792.8, 793.1, 793.4, 793.5, 414/793.6, 793.7, 793.8, 793.9, 794, 974.1, 414/794.3, 794.4, 795; 198/370.06, 418, 198/598
See application file for complete search history.

(56) References Cited

U.S. PATENT DOCUMENTS

| | | | | |
|---|---|---|---|---|
| 726,161 A * | 4/1903 | Harris | | 271/190 |
| 1,111,667 A * | 9/1914 | Miehle | | 271/191 |
| 2,323,174 A * | 6/1943 | Wikle | | 271/190 |
| 3,143,937 A | 8/1964 | Martin | | |
| 3,221,973 A | 12/1965 | Kalbrener | | |

(Continued)

FOREIGN PATENT DOCUMENTS

| | | |
|---|---|---|
| EP | 0621194 | 10/1994 |
| GB | 2079802 | 1/1982 |
| JP | 11-157569 | 6/1999 |
| KR | 20-0251839 | 11/2001 |

OTHER PUBLICATIONS

International Search Report and Written Opinion from PCT/US2009/049602 dated Aug. 25, 2009.

(Continued)

*Primary Examiner* — Gregory Adams
(74) *Attorney, Agent, or Firm* — Workman Nydegger (57) ABSTRACT

A stacking device includes a drive mechanism coupled to a movable band. The movable band is configured to move along an orbital path, and a twin roller with first and second portions engages the movable band and folds the movable band into at least two portions. In some cases, the drive mechanism can also include, or be attached to, two additional rollers that are inside the band and move along the orbital path. A stacking device may also include a roller set with first and second portions that press against a band. A mechanism may cause the band to orbit along a path such that it causes the band to receive a stackable item and move it to a predetermined location. At the predetermined location, the band releases the stackable item while continuing to orbit along the path, but while having zero total velocity.

21 Claims, 5 Drawing Sheets

(56) References Cited

U.S. PATENT DOCUMENTS

| | | | |
|---|---|---|---|
| 3,443,684 A | 5/1969 | Taylor | |
| 3,482,759 A | 12/1969 | Ortiz | |
| 3,690,222 A | 9/1972 | Schroeder | |
| 3,768,807 A * | 10/1973 | Spengler | 271/190 |
| 3,832,826 A | 9/1974 | Ullman | |
| 3,843,038 A | 10/1974 | Sax | |
| 3,949,152 A | 4/1976 | Floessel | |
| 3,957,196 A | 5/1976 | Kellerman | |
| 4,027,817 A | 6/1977 | Fremion | |
| 4,055,257 A * | 10/1977 | Krebs | 414/793.5 |
| 4,094,451 A | 6/1978 | Wescoat | |
| 4,127,264 A * | 11/1978 | Fayolle | 271/191 |
| RE30,325 E | 7/1980 | Waldbauer | |
| 4,215,522 A | 8/1980 | Clift et al. | |
| 4,264,200 A | 4/1981 | Tickner et al. | |
| 4,399,915 A | 8/1983 | Sorenson | |
| 4,522,016 A | 6/1985 | Dirico | |
| 4,608,038 A | 8/1986 | Virta et al. | |
| 4,838,468 A | 6/1989 | Lesse | |
| 4,972,954 A | 11/1990 | Dickie | |
| 5,058,872 A | 10/1991 | Gladow | |
| 5,115,625 A | 5/1992 | Barbulesco et al. | |
| 5,374,326 A | 12/1994 | Marchetti | |
| 5,823,352 A | 10/1998 | Mena et al. | |
| 5,836,498 A | 11/1998 | Turek | |
| 5,975,303 A | 11/1999 | Morell | |
| 6,012,587 A | 1/2000 | McCullough | |
| 6,016,904 A | 1/2000 | Hammock et al. | |
| 6,691,874 B2 * | 2/2004 | Wursthorn | 209/552 |
| 7,100,811 B2 | 9/2006 | Pettersson et al. | |
| 7,913,896 B2 | 3/2011 | Reinkensmeyer | |
| 8,256,620 B2 | 9/2012 | Kiessner | |
| 2002/0011171 A1 | 1/2002 | Usui | |
| 2005/0121356 A1 | 6/2005 | Wisecarver | |
| 2007/0145664 A1 | 6/2007 | Sardella | |
| 2007/0199648 A1 | 8/2007 | Hulverscheidt, Jr. | |

OTHER PUBLICATIONS

International Search Report and Written Opinion from PCT/US2009/054147 dated Aug. 18, 2009.
International Search Report and Written Opinion from PCT/US2009/065552 dated Nov. 23, 2009.
International Search Report and Written Opinion from PCT/US2009/064477 dated Nov. 13, 2009.
International Search Report and Written Opinion from PCT/US2010/022983 dated Feb. 3, 2010.
International Search Report and Written Opinion from PCT/US2010/031017 dated Dec. 29, 2009.
International Search Report and Written Opinion from PCT/US2009/064248 dated Jun. 28, 2010.
International Search Report and Written Opinion from PCT/US2009/064248 dated May 20, 2010.
Office Action dated Jun. 17, 2009 from U.S. Appl. No. 11/942,355.
Office Action dated Mar. 16, 2010 from U.S. Appl. No. 11/942,355.
Notice of Allowability from U.S. Appl. No. 11/942,355 dated Sep. 10, 2010.
Notice of Allowability from U.S. Appl. No. 11/942,355 dated Nov. 30, 2010.

* cited by examiner

ZERO VELOCITY STACKING DEVICE

CROSS-REFERENCE TO RELATED APPLICATIONS

This application claims the benefit of, and priority to, U.S. Provisional Patent Application Ser. No. 61/078,073, filed on Jul. 3, 2008, and entitled "TWIN ROLLER STACKING DEVICE," which is hereby expressly incorporated herein by this reference in its entirety.

BACKGROUND OF THE INVENTION

1. The Field of the Invention

Exemplary embodiments of the invention relate to the stacking of objects, and more particularly to the stacking of packaging materials. Still more particularly, embodiments relate to stacking of packaging materials, such as packaging and box templates formed of corrugated board, using a moving surface that, when the template is stacked, has approximately zero velocity.

2. The Related Technology

In virtually any industry in which a product is produced or used, quantities of the product are produced/used in batches and are, in some form, grouped with other similar products. In some cases, the products may be produced and stacked together, thereby forming an easy to manage, and simple manner of providing and/or using the product.

For instance, in one industry, packaging/boxes formed of corrugated board may be produced according to any of a number of desired formats. A typical machine may, for example, take an initial roll or fanfold of corrugated board and cut the board into a desired shape and design that includes cuts, scores, perforations, creases, or other features. When one such shape is produced, the completed product can then be stacked with other similarly configured products to await shipment or use. For example, when a box is needed, a user may then take one of the packaging templates from the stack and fold it according to the formed scores, perforations, creases, etc.

To ease shipment and storage of the packaging materials, it has been found useful to stack the packaging until such time as it is needed for use or for shipment to an end-user. In that regard, one or more individuals may be positioned at the output end of a machine that produces the desired design. When the produced corrugated board product is released from the machine, those individuals may then place the product on a stack of other products. Notably, such use therefore often necessitates that an individual be stationed at the machine and engage in repetitive movements. In some cases, there may be injuries that result due to an accident involving the production machine, or due to the repetitive nature of the individual's movements. It would therefore be desirable to effectively stack materials with reduced human-labor and/or medical costs.

In other cases, the production machine may output the product for automated stacking. For instance, as a form of automated stacking, a robotic arm may replace the individual. In such a case, the robotic arm can be programmed to move towards the output end of the machine at the time the product is output. The arm can move a suction member into engagement with the product and engage a suction mechanism so that the product can be attached to the robotic arm. The robotic arm can then move the product to a desired stack. Robotic arms can, therefore, also effectively stack materials. Such arms may, however, be complex to manufacture and/or program, such that it would be desirable for a simplified system for reliably and effectively stacking materials.

As products are stacked by machines, such products are typically moved by the machine towards the stacking point. When released to the stack, the velocity of the products then must change, thereby requiring some mechanism for halting the momentum of the product. Movement of the product can also create a risk of jamming the stackable product In contrast, if a product can be moved and placed on a stack such that its speed when it reaches the stack is at or about zero, there is less risk of jamming and/or less need for additional mechanisms for slowing the momentum of the product.

The foregoing description related to stacking of corrugated board is merely exemplary, and it will be appreciated that any number of other products made from metallic, ceramic, polymeric, organic, or other materials can also be produced and it may be desirable to stack or otherwise arrange such materials in a manner similar to that described above for corrugated board products.

BRIEF SUMMARY OF THE INVENTION

Exemplary embodiments of the invention relate to the stacking of objects, and in some embodiments to the stacking of packaging materials. Still more particularly, embodiments relate to stacking of objects, such as packaging templates formed of corrugated board, using a moving surface that, when the template is stacked, is moving but maintains approximately zero velocity.

According to one example embodiment, a stacking apparatus is disclosed that includes a drive mechanism connected to a movable band. The movable band is configured to be moved by the drive mechanism along an orbital path. Additionally a twin roller that has first and second portions is included and they are configured to engage the movable band and fold the band into at least two band portions. In some cases, the band may rotate as well as orbit. At some points along the orbit (e.g., where the stackable object is removed from the movable band), the rotational motion may offset the orbital motion such that there is approximately zero velocity.

In some cases, the drive mechanism can include two rollers that move along the orbital path. Such rollers may, for example, facilitate the rotational and/or orbital movement of the band along the orbital path. The rollers themselves may also move along the orbital path and/or rotate about their internal axes. The twin roller may include two rotating rollers that engage a first surface of the movable band, and at least two guides that alternately engage the movable band. The first surface may be, for example, an interior surface of the band, and the two guides may be configured to engage an exterior surface of the movable band.

Further, some embodiments include a twin roller with two substantially identical portions. Either or both of those identical portions may engage against a first surface of the movable band, and can be configured to engage an exterior surface of the movable band. Additionally, the movable band may be configured such that it orbits around the orbital path as well as rotates around two rollers interiorly located with respect thereto. Those interior rollers may also orbit around the orbital path. In some instances, interior rollers may be part of the drive mechanism, or they may be attached thereto. Further, as the interior rollers orbit along the path, the twin roller and the band may perform a rotational swap. In an example rotational swap, the twin roller orbits one-hundred eighty degrees and separate portions of the twin roller swap places. Orbiting members may thus also be connected to the drive mechanism and the movable band, and can be disposed within the movable band and orbit along the orbital path with the band. At a certain position, the band can at least partially cause the twin roller to rotate about its center. Where the twin roller has two portions, each portion may thus orbit around the center of the twin roller as a part of the rotation of the twin roller.

According to another example embodiment, a stacking apparatus includes a roller set that has first and second portions. A band also passes against the first portion and the second portion of the roller set. The band may do so at the same time, or may alternately engage the first and second portions. A mechanism may also be included that causes the band to orbit along a path. The mechanism is arranged to cause the band to receive a stackable item. The band then moves the stackable item to a desired location (e.g., a stack of similar items), and at that point releases the stackable item. The point(s) at which release is performed may have the band orbiting along the path, while still maintaining approximately zero velocity. In some embodiments, the zero velocity is obtained by the band having a rotation that negates its orbital movement.

Additionally, an example stacking apparatus may include two rollers that engage the band and facilitate the orbit of the band along the bath. For instance, such rollers may be disposed within the band. The band may also have an exterior surface that engages at least a portion of the roller set. The exterior surface may further engage one or more guides of the roller set. For instance, at a position of the band, the band may be folded into two portions by the roller set, and the two portions may be of equal or unequal size. The exterior surface of the band may thus contact the guides, while an interior surface contacts the first and/or second portions of the roller set. Alternatively, the exterior surface may engage the first and/or second portions of the roller set. The mechanism that causes the band to rotate can also include first and second rollers that orbit along the path. At a first position in which the first and second rollers are on the same side of the roller set, the roller set may be relatively stationary relative to its center. At a second position in which the first and second rollers are on opposite sides of the roller set, the roller set may be undergoing a rotation.

In still another example embodiment, a stacking apparatus is disclosed that includes two interior rollers and a selectively rotating twin roller that is separate from the two interior rollers. The twin roller can have first and second portions. A drive mechanism coupled to the two interior rollers may cause the interior rollers to follow an orbital path. Further, an endless band can wrapped around the interior rollers such that the interior rollers are internal relative to the endless band and are engaged against an interior surface of the endless band. The band can also passing through the twin roller, and the twin roller can remain at least partially external relative to the endless band, and can engage against an exterior surface of the endless band. The exterior surface of the band may be set-up to receive stackable items. When the interior rollers orbit, ends of the endless band that are on the interior rollers follow along the same path. Stackable items can be deposited onto a stack of such items by the band in a manner such that the exterior surface of the band when it deposits the stackable item has zero velocity.

The roller set having first and second portions may further be configured to collectively rotate. As it does so, the first and second portions may individually orbit around the center of the roller set. The first and second portions themselves may also rotate about their own, internal axes. Further, the first and second portions can alternately engage the endless band in some cases. The first and second portions may also have different configurations. For instance, in one example embodiment, the first portion includes a first guide, and the second portion includes a second guide. Each of the first and second guides may sometimes be engaged with the band; however, at some positions of the band along the orbital path, the band may engage only the first guide and not the second guide.

These and other features and aspects of the present invention will become more fully apparent from the following description and appended claims, or may be learned by the practice of the invention as set forth hereinafter.

BRIEF DESCRIPTION OF THE DRAWINGS/APPENDIX

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The embodiments described herein extend to methods, devices, systems, assemblies, and apparatus for stacking objects. Such are configured to, for example, reliably stack objects in a simplified manner by providing an approximately zero velocity surface which causes stacking of such items.

Reference will now be made to the drawings to describe various aspects of exemplary embodiments of the invention. It is understood that the drawings are diagrammatic and schematic representations of such exemplary embodiments, and are not limiting of the present invention, nor are any particular elements to be considered essential for all embodiments or that elements be assembled or manufactured in any particular order or manner. No inference should therefore be drawn from the drawings as to the necessity of any element. In the following description, numerous specific details are set forth in order to provide a thorough understanding of the present invention. It will be obvious, however, to one of ordinary skill in the art that the present invention may be practiced without these specific details. In other cases, well known aspects of stackable objects, general manufacturing techniques, and packaging products are not described in detail herein in order to avoid unnecessarily obscuring the novel aspects of the present invention.

Figure 1:
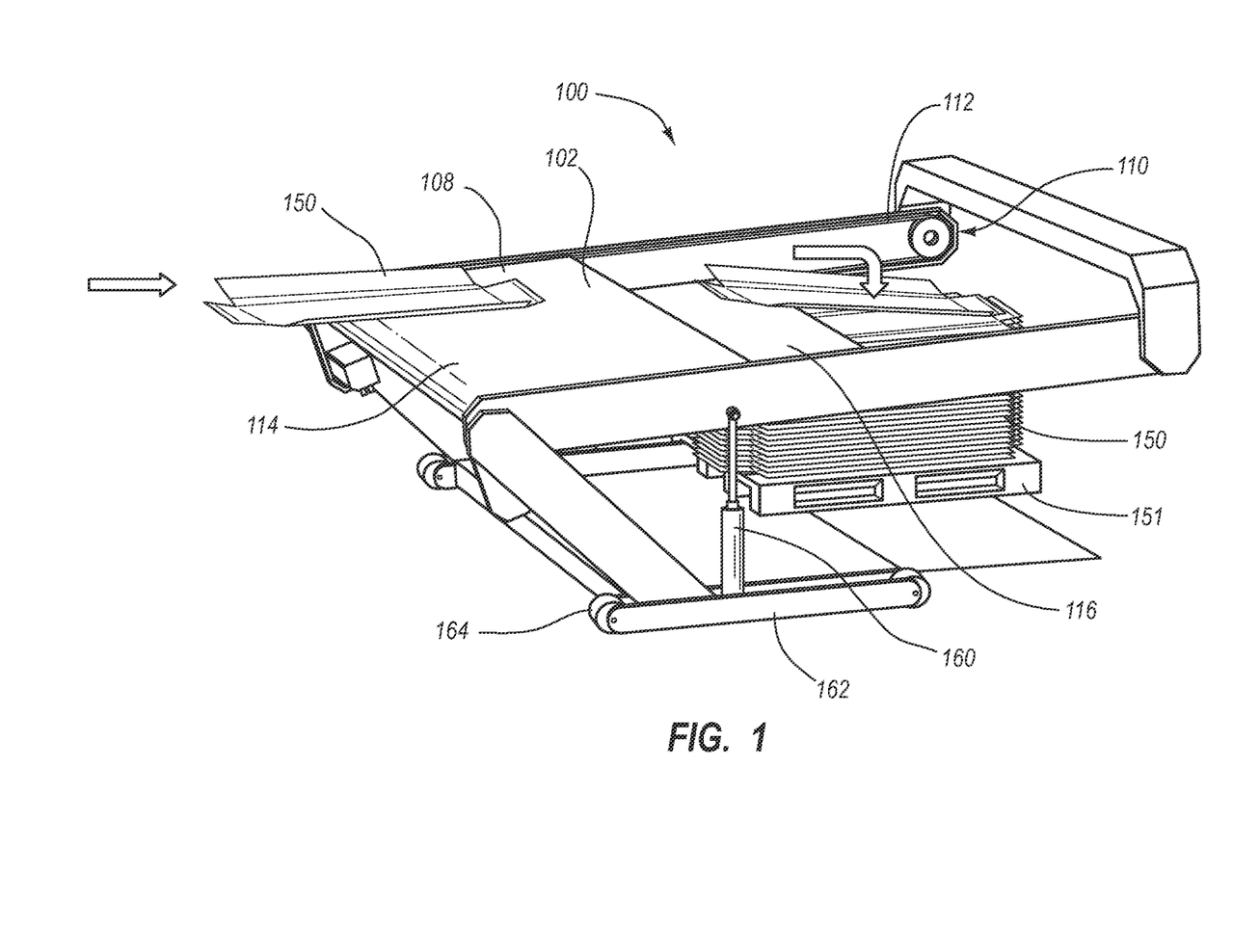
FIG. 1 illustrates an example stacking device according to some aspects of the present invention, and which includes a band around two rollers.

FIG. 1 and the following discussion are intended to provide a brief general description of an exemplary stacking device 100 in which embodiments of the invention may be implemented. While stacking device 100 for stacking packaging 150 is described below, this is but one single example, and embodiments of the invention may be implemented with other types of stackable objects. Accordingly, throughout the specification and claims, the phrases "stackable object," "stackable item," and the like are intended to apply broadly to any type of item that can be automatically stacked with an approximately zero velocity system or device such as those described herein.

FIG. 1 provides a general overview of a stacking device 100 according to aspects of the present invention. The stacking device 100 in FIG. 1 is, however, only one example of a suitable stacking device 100 or stacking system and is not intended to suggest any limitation as to the scope of use or functionality of an embodiment of the invention. Neither should the illustrated and described stacking device 100 be interpreted as having any dependency or requirement relating to any one or combination of components illustrated in the stacking device 100.

With reference to FIG. 1, an exemplary stacking device 100 is broadly illustrated to include an endless band 102. In the illustrated embodiment, endless band 102 is folded. More particularly, as shown in FIGS. 2A-2E, band 102 is folded by being pinched together within a twin roller 120, such that two portions of band 102 are created, namely an upper portion having an interior and exterior surface, and a lower portion having an interior and exterior surface. As described herein, such folding can facilitate stacking of packaging or other materials, and can further do so such that at the stack 152 of such materials 150, the to-be-stacked material has approximately zero velocity.

In particular, stacking device 100 includes in this embodiment a drive mechanism 110 which band 102 to cyclically orbit around a path 112. At a first position 114 along path 112, packaging materials 150 can be placed on a first portion 108 of band 102. As band 102 cyclically orbits around path 112 and reaches a second position 116, packaging materials 150 may drop off band 102 and onto a stack 152 of similar packaging materials 150. Before, after, or at about the same time that the packaging materials 150 are dropped onto stack 152, a second portion of band 102 may reach first position 114 along path 112 and receive additional packaging materials 150. The cycle may continue such that as the additional packaging materials 150, and thus the second portion of band 102, reach second position 116, those additional packaging materials 150 are dropped or otherwise placed on stack 152.

Stacking device 100 as illustrated in FIG. 1, optionally includes a variety of additional features. For example, it will be appreciated that as packaging materials 150 are stacked by device 100 on stack 152, the height of stack 152 may increase. For instance, in the illustrated embodiment, a pallet 151 is provided as a base for stack 152; however, in other embodiments, stack 152 may be formed on another surface such as a floor, such that it is not necessary to have pallet 151. Before any materials 150 are stacked on pallet 151, the drop from band 102 to pallet 151 may be substantial. Such a drop could potentially cause packaging materials 150 to fall towards pallet 151 in an off-line manner, thereby causing the bottommost packaging materials of stack 150 to potentially be crooked.

To reduce or eliminate packaging materials 150 from falling off-line, stacking device 100 may be configured to reduce the drop from band 102 to pallet 151. In particular, a portion of, or all of, device 100 may be movable so as to allow for easier stacking of materials, regardless of the height of stack 152. In one example, such as that illustrated in FIG. 1, device 100 includes a lift 160. Lift 160 can include, for example, pneumatic or hydraulic cylinders which move at least part of device 100 upward or downward, and can optionally move the entire device 100 upward or downward. For instance, in the illustrated embodiment, a deck portion of device 100 that includes drive mechanism 110 and band 102 substantially housed therein is connected to one end of lift 160, and a second end of lift 160 is connected to a base 162 of device 100. In this manner, if there are very few items on stack 150, lift 160 can be actuated and the deck of device 100 may be lowered so that the drop distance is decreased. Notably, device 100 may be lowered in any suitable manner, including automatically or manually. As stack 152 increases in height, device 100 may then automatically or manually be moved upward to allow for efficient and reliable stacking even at increased heights of materials 150.

Another aspect of lift 160 is that by allowing device 100 to have its height changed, device 100 can be adapted for use with multiple different machines or components. For example, various types of packaging or other materials may need to be stacked, and may be made or formed from different machines. The different machines may output the produced products at different heights. By adjusting lift 160, device 100 can be easily adapted to operate with the multiple output devices, despite differences in height at their outputs. Moreover, although a single lift 160 is illustrated in the illustrated embodiment, it will be appreciated that multiple lifts can be used. For example, there may be a second lift on an opposing side of device 100. Additionally, multiple lifts may be used to change the height or orientation of different components of device 100. For instance, a first lift may adjust the height or angle at a first end of device 100 (e.g., near first position 114), while a second lift can adjust the height of device 100 closer to stack 150.

Figure 3A:
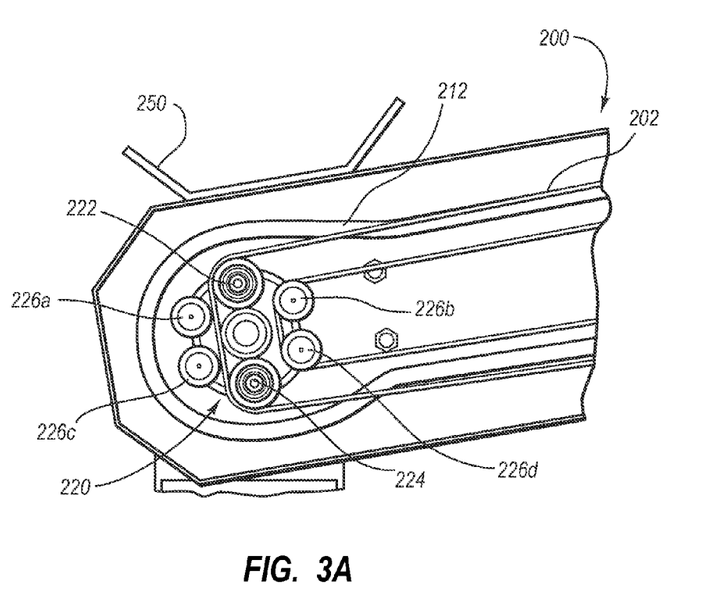
FIG. 3A illustrates an alternative embodiment of a stacking device according to some aspects of the present invention.

Additionally, as illustrated in FIG. 1, device 100 may be configured to be easily movable so that it can be used with multiple stacks, multiple output devices, and the like. In particular, in the illustrated embodiment, base 162 of device 100 includes multiple wheels 164 attached thereto. Wheels 162 are merely one example of a type of transport device that may allow for the efficient movement of device 100. For example, in the illustrated embodiment, a user may tilt device 100 onto front or back wheels 164 to move device 100. In other embodiments, however, it is not necessary to tile device 100. For example, as illustrated in FIG. 3A, wheels may be attached to a base such that they can be used without tilting the stacking device, and such wheels can optionally include a locking mechanism to selectively lock the wheels or other transport device(s) in place.

Figure 2A:
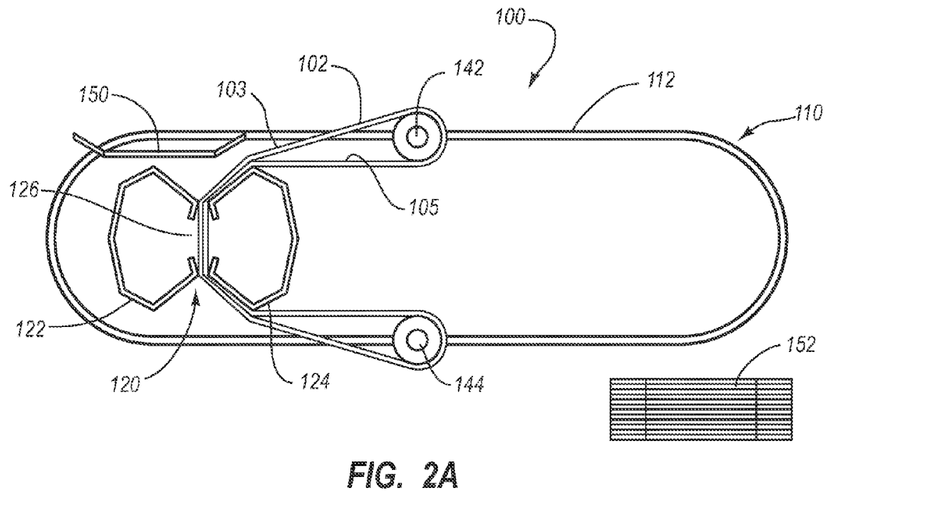
FIG. 2A schematically illustrate a side view of the example stacking device in FIG. 1A.

Turning now to FIGS. 2A-2E, a more particular discussion of an exemplary manner of implementing the stacking device 100 of FIG. 1 with approximately zero velocity at stack 152 is illustrated. It will be appreciated in view of the disclosure herein that the exemplary embodiments in FIGS. 2A-2E are schematic illustrations of stacking device 100. Specifically, various components of stacking device 100 of FIG. 1 have been removed, and the scale thereof changed, so as to more clearly illustrate various aspects of the desired embodiment. For example, stacking device 100 in FIG. 2A is illustrated with a scale that has been changed relative that of stacking device 100 in FIG. 1 by shortening the length of path 112 while increasing the height thereof. It will be appreciated in view of the disclosure herein that such change of scales is provided to more allow a more clear description and illustration of a partial orbit of rollers 142, 144 around path 112, as reflected in the partial orbital cycle of FIGS. 2A-2E.

With reference now to FIG. 2A, a stacking device 100 is illustrated and includes, among other things, a twin roller 120, a band 102, and a set of orbiting rollers 140 (e.g., first roller 142 and second roller 144). In the illustrated embodiment, band 102 has a looped configuration and is therefore an endless band. Further, band 102 has a continuous construction and is specifically looped around first roller 142 and second roller 144, such that each of the two rollers 142, 144 is internal with respect to band 102. Thus, in one embodiment, band 102 can be configured to slide around first roller 142 and/or second roller 144 as they rotate, or even in the event that first and/or second rollers 142, 144 are not rotating.

As further illustrated, band 102 is, in this embodiment, also passed through the interior of twin roller 120. In particular, in this example, twin roller 120 includes a first half 122 that is spaced apart from a substantially identical second half 124. In this embodiment, band 120 passes between first half 122 and second half 124 of twin roller 120 by passing through the space 126 that separates first half 122 and second half 124.

In embodiment illustrated in FIG. 2A, first roller 142 and second roller 144 are positioned to be on the same side of twin roller 120 and are, in this embodiment, on the same of device 100, relative to first half 124, inasmuch as both first and second rollers 142, 144 are positioned in the same direction from first half 122 as is second half 124 of twin roller 120. As can be seen in FIG. 2A, this produces a folding effect that essentially folds band 102 around second half 124 of twin roller 120. This may cause, for instance, band 102 to rub against and engage at least second half 124 of twin roller 120.

As is further schematically illustrated, an example stacking device 100 may include a predefined path such as the illustrated path 112. In some embodiments, first roller 142 and second roller 144 are configured such that they will move essentially along orbital path 112. Optionally, as rollers 142, 144 move along orbital path 112, they are maintained at an equal distance from each other, with such distance being measured around the circumference of orbital path 112. Thus, in FIG. 2A, when first roller 142 is at a mid-point of the top portion of orbital path 112, second roller 144 may be at a mid-point of the bottom portion of orbital path 112. Of course, in other embodiments, orbital path 112 may not be symmetric, rollers 142, 144 may be spaced so that they are not equidistant at all portions along orbital path 112, or rollers 142, 144 may move independently of each other such that the distance therebetween changes with time. Additionally, while path 112 is illustrated as generally elliptical, it may have other shapes. For example, path 112 may be polygonal, and may be symmetric or non-symmetric.

The orbital path 112 may represent, in the embodiment in FIG. 2A, a portion of drive mechanism 110 that is used to move first and second rollers 142, 144 along path 112. For instance, driving mechanism 110 may include a drive belt, chain or track and/or driving gears, sprockets, or wheels (such as is shown in FIG. 1) which substantially define path 112. As such, a drive belt, chain or track can move along path 112, and drive mechanism 110 can likewise cause first and second rollers 142, 144 to follow approximately the same path 112.

Figure 2B:
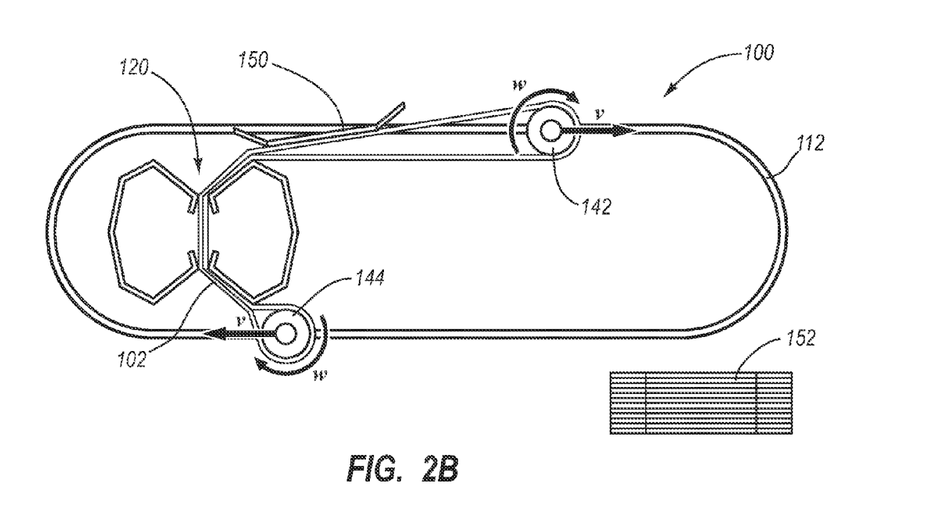
FIGS. 2B-2E schematically illustrate side views of the example stacking device in FIG. 1, in successive positions along a clockwise orbit of the band and two rollers.
Figure 2C:
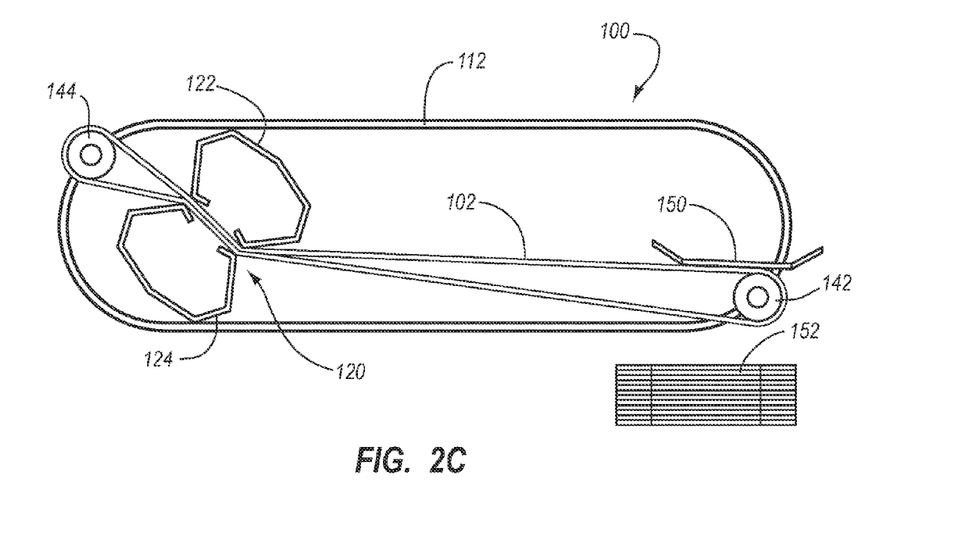

In the example embodiment in FIGS. 2A-2E, first and second rollers 142, 144 are illustrated as moving clockwise around orbital path 112, as represented by arrows v in FIG. 2B. For instance, as shown in FIGS. 2A and 2C, first roller 142 can move from a position at approximately the mid-point of the top of orbital path 112 by orbiting clockwise along path 112 to a position essentially at the right side of path 112 (which motion can, for example, be tracked by following the clockwise movement of first roller 142 from its position in FIG. 2A, to the position in FIG. 2B, and subsequently to the position in FIG. 2C). In that same regard, second roller 144, which was shown in FIG. 2A at approximately the mid-point of the bottom of path 112, can move to subsequent positions which are closer to the illustrated left side of orbital path 112 (which motion is shown, for example, in following the position of second roller 144 in FIG. 2A through FIG. 2C). Of course, the reference to right and left sides of stacking device 100 or path 112 are merely for convenience when referring to the illustrated figures, and are arbitrary as a perspective from the other side of device 100 could yield opposite directions.

As rollers 142, 144 orbit around path 112, they may also allowed to rotate about their respective longitudinal axes. This is best illustrated in FIG. 2B, which illustrates rollers 142, 144 as having a generally linear motion along path 112 (and along arrows v), while also having a rotational motion about their respective axes (as represented by arrows ω). Thus, as rollers 142, 144 move in respective directions laterally along orbital path 112, band 102 and/or rollers 142, 144 can also rotate in the same direction as the orbital path 112. In particular, in the illustrated embodiment, as rollers 142, 144 orbit in a clockwise direction along path 112, each of the first and second rollers 142, 144 may also rotate around their respective internal axes in a clockwise direction.

Figure 2D:
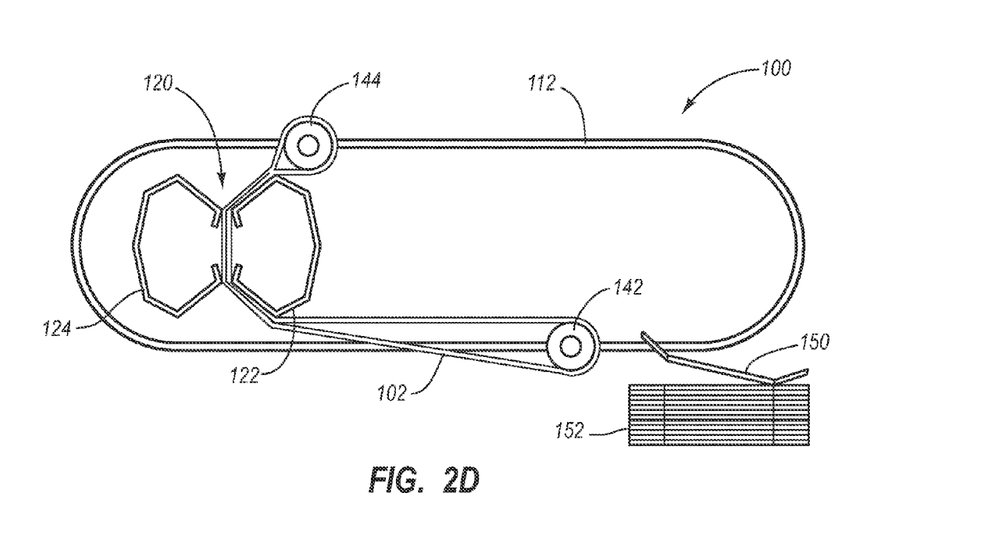
Figure 2E:
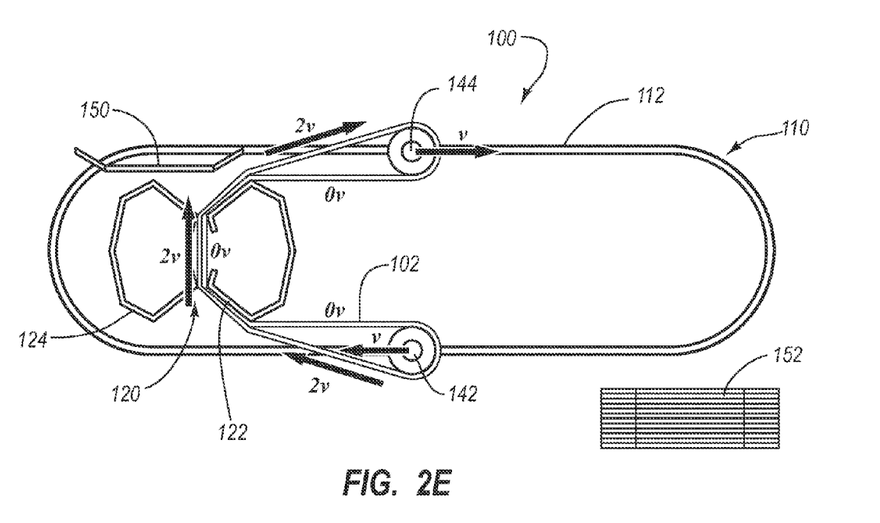

Returning briefly to FIG. 2A, it can be seen that as band 102 and rollers 142, 144 move along orbital path 112, packaging 150 may be placed on band 120. For example, in the illustrated embodiment, packaging 150 can be placed on an exterior surface 103 of the upper portion of band 102. As rollers 142, 144 and band 102 then orbit along path 112 to the position in FIG. 2B, packaging 150 is carried on band 102 and towards stack 152. Through the continued orbit, as illustrated in FIGS. 2C-2E, the top portion of band 102 becomes gradually closer to stack 152 and at the points illustrated in FIGS. 2C and 2D, drops packaging 150 onto stack 152. Motion of rollers 142, 144 and band 102 continues around path 112 and the stacking cycle can begin anew. In the new cycle, however, such as that shown in FIG. 2E, twin-roller 120, band 102, and rollers 142, 144 have effectively switched positions. In particular, the portion of band 102 that was previously on the bottom of path 112 has now followed the circumference of path 112 and is on the top of path 112. Similarly, second roller 144 has now moved to the top of path 112. Additionally, while band 102 was previously folded around the second half of twin roller 120, twin roller 120 has also rotated about one hundred eighty degrees, such that band 120 is now folded around first half 122 of twin roller 120.

FIGS. 2B-2E show in greater detail an example manner in which various components of a stacking device 100 can perform a rotational swap and switch places as described herein. In particular, FIG. 2B illustrates a position of first and second rollers 142, 144 just before twin roller 120 begins to rotate about its central axis. In one embodiment, for example, twin roller 120 can freely rotate around its central axis and/or an axle on which it is disposed. In such an embodiment, it is not necessary that twin roller 120 be coupled to drive mechanism 110. Indeed, in some embodiments twin roller 120 is not connected to a separate motor, belt, chain, or the like, but instead is caused to rotate by endless band 102 as it orbits around path 112, and as band 102 is pulled by rollers 142, 144. Thus, twin roller 120 may be indirectly coupled to drive mechanism 110 (e.g., through band 102 and/or rollers 142, 144) as opposed to directly coupled to drive mechanism 110. For example, as shown in FIGS. 2B-2E, as band 102 orbits along path 112, rollers 142, 144 will take the bottom portion of band 102 around from the illustrated right side of twin roller 120 and around to the left side of twin roller 120. Second roller 144 can then orbit clockwise along path 112 and around twin roller 120, thereby causing band 102 to engage against first half 122 of twin roller 120. By engaging twin roller 120 in this manner, band 102 can cause twin roller 120 to rotate to the position finally illustrated in FIG. 2D. Of course, in other embodiments, twin roller 120 may be directly coupled to drive mechanism 110, or a separate drive mechanism (not shown), that causes twin roller 120 to rotate.

To facilitate movement of band 102, band 102 optionally includes a high friction surface on its exterior 103, and may optionally have a low friction surface on its interior 105. As can be seen in FIGS. 2A-2E, exterior surface 103 receives packaging materials 150, but also engages against each of first and second halves 122, 124 of twin roller 120. One feature of such a high-friction surface is that it can facilitate gripping of packaging 150 such that there is little to no slip between packaging 150 and band 102 as band 102 orbits around path 112. A second feature of such a high friction surface treatment is thus that it can also facilitate movement of band 102 in a manner that reliably stacks packaging 150.

A low friction interior surface 105 may similarly facilitate such reliable stacking of packaging 150. For instance, a low friction surface can allow band 102 to freely rotate around first and second rollers 142, 144 which are in contact with interior surface 105 of band 102. In addition, and as shown in FIG. 2A, band 102 may be folded on itself such that within twin roller 120, two locations of interior surface 120 slide against each other inside twin roller 120. A low friction interior surface 105 can therefore reduce friction when the interior band surfaces 105 glide against each other and inside twin roller 120.

Referring now to FIG. 2E, a more particular discussion of drive mechanism 110 is provided. In particular, drive mechanism 110 optionally includes a drive belt, chain, or the like such as illustrated in FIG. 1. As a belt or chain, for example, moves, it may move generally along path 112 at a particular velocity (v). As drive mechanism 110 moves at such a velocity, first and second rollers 142, 144 can correspondingly orbit at about the same velocity (v) around path 112. In the orientation illustrated in FIG. 2E, second roller 144 (i.e., the top roller) thus moves along path 112 and to the right at velocity (v), while first roller 142 (i.e., the bottom roller) moves along path 112 and to the left at velocity (v). Band 102 may engage twin roller 120, optionally by including a high friction surface, and prevent, or substantially eliminate, sliding of band 102 relative to the surface of twin roller 120 on which it is engaged. As a result, the velocity of band 102 against first half 122 of twin roller 120 may be approximately zero. As band 102 is substantially engaged against first half 122 of twin roller 120, and as first and second rollers 142, 144 continue to orbit, band 102 may roll around first and second rollers 142, 144. In particular, as band 102 has approximately zero relative velocity against first half 122 of twin roller 120, the relative velocity of other portions of band 102 approximately double. By way of example, portions of endless band 102 on top of second roller 144 and under first roller 142 have about double the velocity (v), while the relative velocity of band 102 under second roller 144 and above first roller 142 may be about zero. Thus, it can be seen that as packaging materials 150 are received, they can be fed to the right (in the illustrated embodiment) at a relative velocity equal to that of the portion of the band on which it is received (e.g., 2 v).

Furthermore, it will be appreciated that as rollers 142, 144 orbit around path 112, and the orbital motion of a roller begins to move it away from stack 152 (i.e., left in the illustrated embodiment), packaging material 150 on band 102 on top of such a roller 142, 144 experiences a change in relative velocity. Specifically, as shown in FIGS. 2C-2E, when bottom roller 142 orbits path 112 and begins to move left along path 112, the relative velocity of band 102 on top of that bottom roller 142 (which is the portion of the band on which packaging materials 150 were previously placed) has about zero velocity. Thus, the portion of band 102 that is delivering the packaging 150 has effectively no velocity when packaging 150 gets to stack 152. As a result, band 102 disappears beneath packaging 150 without any relative speed. Such zero velocity stacking thus makes it possible to reliably stack complex packaging or other stackable objects, either alone or in virtually unlimited combinations, with little to no risk of jamming.

Another manner of describing the above is to look at the orbital and rotational motions of the first and second rollers 142, 144. In particular, as noted above, rollers 142, 144 are moving around orbital path 112 at the velocity (v), while twin roller 102 can have effectively no orbital motion. Thus, as second roller 144 orbits clockwise (and to the right in FIG. 2E) at velocity (v), first roller 142 orbits clockwise (and to the left in FIG. 2E) at velocity (v). As band 102 then engages twin roller 120, band 102 can roll relative to orbiting rollers 142, 144. In particular, rollers 142, 144 can then have not only an orbital motion at the speed of drive mechanism 110 (e.g., at velocity (v)), but rollers 142, 144 can also be rotating clockwise around their own, internal axes at the same speed (v). Thus, with respect to the illustration in FIG. 2E, at top roller 144, band 102 moves to the right, and orbits along path 112, with a velocity (v), while also rotating clockwise around top roller 144 (also to the right in the illustrated embodiment) at a velocity (v). Thus, the relative velocity of band 102, when on the top of path 112 is the combination of the two velocities. In particular, while on the top of path 112, roller 144 is moving to the right at velocity (v) and rotating at velocity (v), roller 142 and band 102 on roller 142 have velocities of about (2 v) as the orbital and rotational motions are in the same direction.

In a similar manner, when a roller and band 102 drop down on path 112 and roller 142 starts to move to the left in the illustrated embodiment, band 102 has a velocity (v) to the left along orbital path 112. Nonetheless, roller 142 continues to rotate clockwise, such that band 102 is rotating around roller 142 to the right at velocity (v). Thus, the relative velocity of band 102, when on the bottom side of path 112, is the combination of the two velocities. In particular, the orbital velocity (v) to the left combined with the rotational velocity (v) to the right, to combine and give a velocity of about 0 v, inasmuch as the orbital and rotational motions are in opposite directions.

It should be appreciated that aspects of the above are merely exemplary, and are not limiting of the present invention. For example, in the illustrated embodiments, the illustrated path 112 is substantially elliptical, although this is exemplary only, and may be a matter of scale. For instance, the path 112 of device 100 illustrated in FIG. 1, appears more elongated and/or linear due to the increased ratio of the length of path 112 relative to the height of path 112.

Furthermore, although a twin roller 120 is illustrated in FIGS. 2A-2E, this too is exemplary only. In other embodiments, an exemplary roller may have, for example, non-identical halves or three or more portions. For instance, in the illustrated example while band 102 is folded through twin roller 120 only a single time, in other embodiments band 102 may be folded multiple times, and can, in some cases, be folded multiple times around a selectively rotating roller such as twin roller 120. For instance, band 103 may be folded twice through a triple roller, which could result in three folds or portions of the endless band. Similarly, a quadruple roller may have the endless band pass through four times, and could result in four portions of the endless band. Thus, while the term "twin-roller" is used herein, it should not be limited to a roller having only two portions, but can include a roller having two or more portions.

Figure 3B:
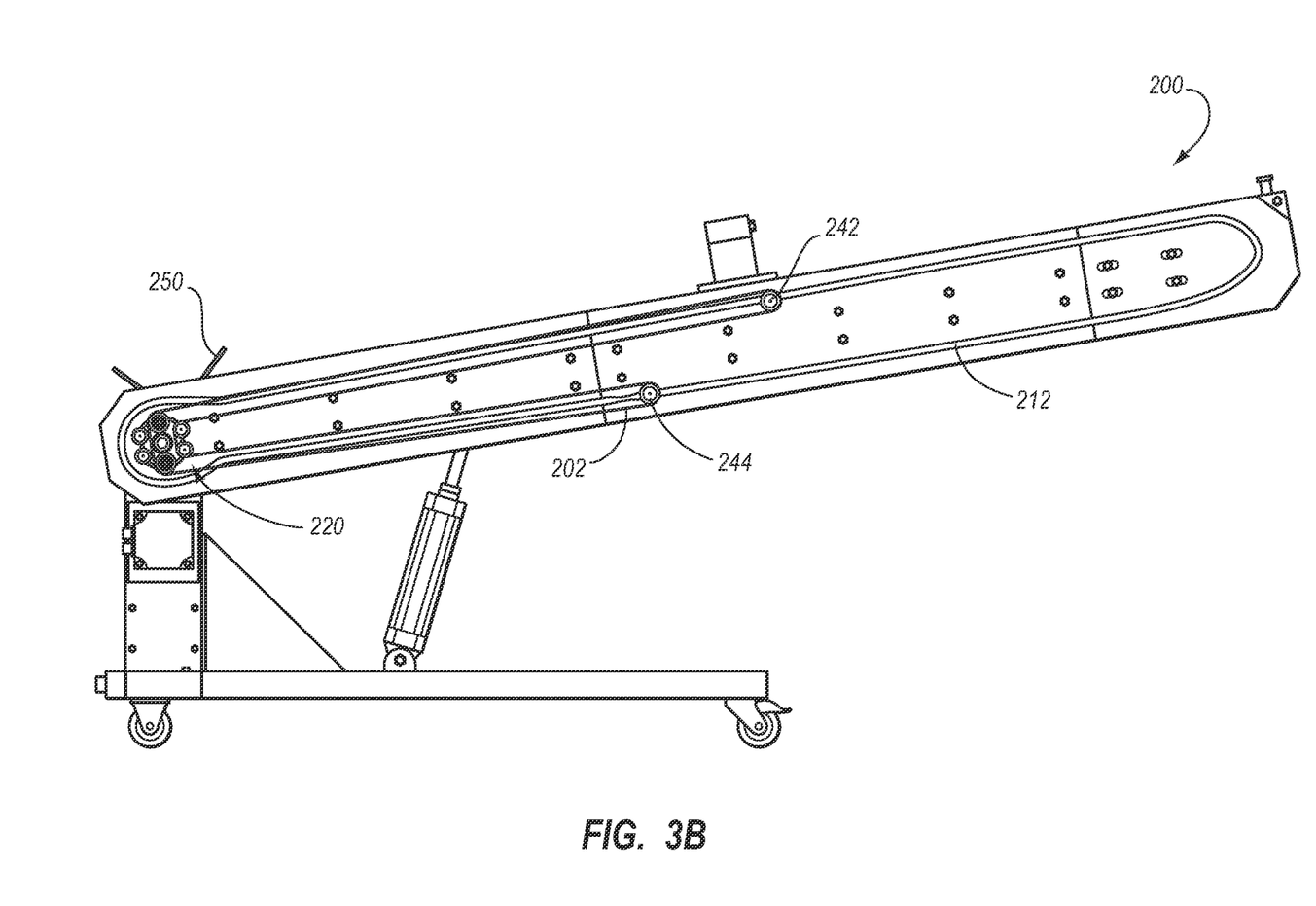
FIG. 3B illustrates a partial, close-up view of a twin roller within the example embodiment of FIG. 3A.

FIGS. 3A and 3B illustrate, for example, alternative embodiments of a stacking device 200, in which an alternative configuration of a twin roller 220 is provided. As shown in FIG. 3A, for example, a stacking device 200 includes features similar to device 100 in FIG. 1. For example, stacking device 200 includes a band 202 that is wrapped around two orbiting rollers 242, 244, while also being folded between a twin roller 220. Also similar to device 100 of FIG. 1, as a stackable object 250 is received on band 202, rollers 242, 244 can orbit around a path 212. As rollers 242, 244 do so, band 202 also orbits therearound, which causes object 250 to move towards a stacked position. Furthermore, as roller 244 moves clockwise on the bottom side of path 212 (i.e., to the left in the illustrated embodiment), it can cause twin roller 220 to rotate about its axis and roller 244 may then move to the top of path 212 while roller 242 moves to the bottom of path 212. As further illustrated in FIG. 3A, it can be seen that path 212 can have any suitable configuration. In particular, in the illustrated embodiment, path 212 is not symmetric. Specifically, in the illustrated embodiment, the portion of path 212 most proximate twin roller 220 has a shape that is different than the shape of path 212 at a portion most distal to twin roller 220.

Turning now to FIG. 3B, a more particular discussion is provided of the alternative twin roller 220 illustrated in FIG. 3A. As will be appreciated in view of the disclosure herein, twin roller 220 itself includes various components, and such components may be fixed to the housing of device 200, may be coupled together as a sub-assembly, or may be installed in any other suitable manner. In the particular embodiment illustrated in FIG. 3B, twin roller 220 is an assembly and includes two rotating rollers 222, 224, and four stationary rollers 226a-d. As described above with regard to FIGS. 1-2E, a band 102 was folded within twin roller 120. In a similar manner, it can be seen that band 202 is folded within twin roller 220. In particular, in the illustrated embodiment, band 220 is wrapped around the two rotating rollers 222, 224 as well as two guide rollers 226b, 226d, although such configuration is merely one alternative embodiment of a twin roller.

More specifically, in the illustrated embodiment, band 202 may be wrapped around a top roller (e.g., roller 242 in FIG. 3A) and a bottom roller (e.g., roller 244 in FIG. 3A) that move along path 112. The portion of band 202 between rollers 242, 244 may then directed towards twin roller 220. The outermost portion of folded band 202 (e.g., the portion of band 202 moving along the top of roller 242 and along the bottom of roller 244) enters twin roller 220, and engages against rotating rollers 222, 224, while the inner-most portion of folded band 202 (e.g., the portion of band 202 moving along the bottom of roller 242 and the top of roller 244) enters twin roller 220, and engages against guide rollers 226b, 226d.

In the illustrated position, band 202 may roll around rotating rollers 222, 224, thereby causing them to rotate, and may also roll relative to guide rollers 226b, d. In one embodiment, guide rollers 226b, d are stationary and do not themselves rotate about their internal axes, although in another embodiment guide rollers 226a-d may be configured to rotate. Additionally, while the above discussion notes that rotating rollers 222, 224 are rotated by band 202, this is exemplary only and in other embodiments, for example, rollers 222, 224 may be connected to a drive mechanism that moves rollers 242, 244, such that could rotate even without band 202.

In view of the above discussion related to FIGS. 2A-2E, it will be appreciated that rollers 242, 244 illustrated in FIG. 3A may orbit around path 212. As part of such an orbit, roller 244 may, for example, move clockwise around path 212 and to the left on the bottom portion of path 212. As roller 244 approaches twin roller 220, the path of band 202 within twin roller 220 may change. Specifically, as roller 244 moves towards guide rollers 226a, 226c, the outermost portion of band 202 that is engaged against rotating rollers 222, 224 may be moved into engagement with guide rollers 226a, 226c. Moreover, the innermost portion of band 220 previously engaged with guide rollers 226b, 226d may move into engagement with rotating rollers 222, 224. Further, as the rotation continues, band 220 may engage guide rollers 226a, 226c and cause twin roller 220 to rotate. Specifically, twin roller 220 may rotate about 180 degrees around its center, so that rotating rollers 222, 224 swap positions, and such that guide rollers 226a, 226c swap positions with guide rollers 226b, 226d.

It should be appreciated that the twin roller 220 illustrated in FIGS. 3A, 3B is also merely one example of a twin roller suitable for use in a stacking device according to aspects of the present invention, and is not limiting of the present invention. For example, in other embodiments, guide rollers 226a-d may be replaced. By way of example, a single roller may be used on each side of rotating rollers 222, 224. Further, it is not necessary that guide rollers be used at all. For instance, guide rollers 226a-d may be replaced with a bar or rail, or multiple bars or rails, that engage against band 202 within twin roller 220. Furthermore, it is not necessary that the twin roller include separate rollers. For example, in an alternative embodiment, twin roller may include a single interior, rotating roller and then twin guides on either side thereof.

Accordingly, twin roller 220 can have multiple configurations and can provide many of the same features as twin roller 120 of FIGS. 2A-2E. Indeed, different configurations may be desirable based on the application. For example, the configuration in FIGS. 3A, 3B may be used where, for example, a band wears significantly when it rubs against itself (e.g., as illustrated in FIGS. 2A-2E) and/or where it is desired to reduce the noise created by rubbing against itself. Nevertheless, regardless of the embodiment used, twin rollers can allow a band to be folded to facilitate approximately zero velocity stacking of stackable objects. Further, such twin roller configurations may also rotate to coincide with the orbital motion of the orbiting rollers that carry the band towards an object stack, so that different halves, or different rotating rollers, of the twin roller, swap places during a half-orbit of the orbiting rollers that move along the orbital path.

In some cases, the various embodiments disclosed herein can provide additional features and aspects useful in making a stacking device 100, 200 that operates with low power consumption and/or a higher amount of safety for an operator. For instance, in the embodiment of a stacking device 100 in FIGS. 2A-2E, the band 102 may engage the halves of twin roller 120 and cause twin roller 120 to rotate one hundred eighty degrees at a time. The same concept can be employed with stacking device 200, with band 202 engaging rollers 224, 226 and guides 226a-d and thereby causing twin roller 220 to rotate one hundred eighty degrees. In the case of stacking device 200, rollers 222, 224 and guides 226a-d may be connected to a carrier that couples them together for collective rotation about the center of twin roller 220. In some instances, the movement of belt 202 as it alternately engages guides 226a-d and opposing sides of rollers 224, 226 can rotate twin roller 220 more efficiently than is performed with twin roller 120. In this regard, the torque required to rotate twin roller 220 may be reduced, thereby allowing the size of the motor used with drive mechanism 210 to be reduced. By reducing the torque and the motor size/output, the efficiency of the stacking device may be improved and made safer for operation.

As will be appreciated in view of the disclosure herein, no features or components described herein are considered essential or necessary for all purposes, unless expressly described as such. Furthermore, while the illustrated embodiments, and the discussion related thereto, provide specific examples of operating stacking devices, such illustrations and discussions are exemplary only. For example, while the illustrated cycle in FIGS. 2A-2E, and the discussion related thereto, depict releasing packaging materials from one portion of a band and onto a stack prior to receiving additional packaging materials on the second portion of the band, such is exemplary only. Indeed, as illustrated in FIG. 1, in some cases additional packaging materials may be received on the second portion of the band before or at about the same time that the first portion of the band releases the packaging materials onto the stack. In fact, inasmuch as the illustrated band can cyclically orbit and can release packaging materials onto the stack as the packaging materials reach the stack, there is no requirement for any particular timing. Thus, while some systems utilizing a robotic arm may make use of programming of specific time elements, some embodiments of the present invention need not be limited to specific timing for receiving packaging materials. Thus, there may be a continuous flow of packaging materials from one or more machines, and at regular or at irregular intervals. Indeed, multiple machines with different stackable items or configurations, may each use the same stacking machine either synchronously or asynchronously.

Further, operation of stacking devices according to the embodiments disclosed herein or which may be learned by one skilled in the art in view of such disclosure, do not need to operate on a continuous loop. For example, while in one embodiment the band may orbit around the orbital path with a generally constant velocity, this is not necessary. For example, in some embodiments, the band may stop, or may change velocity during an orbit. For instance, at the point where a stackable object is received, the band may stop moving, and then may again start moving once the stackable object is received thereon.

Additionally, while the orbiting rollers described and illustrated herein are shown to be on the inside of a deck and/or on the inside of a band, in other embodiments such rollers may be exteriorly placed. In addition to the above, or in combination with only certain aspects of the above or other stacking machines, a stacking device or packaging machine according to embodiments of the present invention may also embody other features.

For example, according to one aspect, a stacking device may include one or more features that facilitate accuracy in placement of objects on the stack. For instance, when a device such as those illustrated above places (e.g., drops) packaging or other stackable objects onto a stack, there may be some inaccuracy in the lateral and/or lengthwise directions. To improve upon the accuracy, a physical stop, such as a post, bar, or support, may be used on the stack itself. Additionally, or alternatively, a sensor (e.g., an optical sensor) may alternatively be used to detect the positioning of the stackable object. If, for example, the material is not within the tolerances, the sensor may alert the system and cause an individual or other device to move the packaging. Additionally, or alternatively, when such a sensor is actuated, a ram may press against the packaging to move it into position, and such ram may be actuated automatically upon receiving feedback from the sensor, or may be manually actuated by an individual operator.

In other embodiments, other positioning systems and/or safety mechanisms may be employed. For example, a positioning system may be used to ensure that the band remains properly positioned around the orbiting rollers (e.g., by being maintained centered on the rollers). To maintain such a position, grooves may be formed in the rollers to fit the band therein and/or Bomberade rollers may be utilized. Additionally, a cover or other safety mechanism may be employed to guard against insertion of hands or fingers inside or near the orbiting band.

The invention is susceptible to various modifications and alternative means, and specific examples thereof have been shown by way of example in the drawings and are herein described in detail. It should be understood, however, that the invention is not to be limited to the particular devices or methods disclosed, but to the contrary, the invention is to cover all modifications, equivalents, and alternatives falling within the spirit and scope of the claims.

I claim:

1. A stacking apparatus, comprising:
   a drive mechanism;
   a movable band connected to said drive mechanism, wherein said movable band is configured to be moved by said drive mechanism along an orbital path;
   a twin roller having first and second portions, wherein said first and second portions are configured to engage against said movable band and to fold said movable band into at least two band portions, said movable band extending through said twin roller between said first and second portions thereof; and
   at least two orbiting members connected to said drive mechanism and said movable band, said at least two orbiting members being disposed within said movable band and orbit along said orbital path with said movable band, and at a predefined position of said orbiting members, said movable band at least partially causing said twin roller to rotate about its center.

2. The stacking apparatus of claim 1, wherein said at least two orbiting members include at least two rollers configured to move along said orbital path.

3. The stacking apparatus of claim 2, wherein sad at least two rollers are further configured to rotate about their internal axes.

4. The stacking apparatus of claim 1, wherein said twin roller comprises:
   at least two rotating rollers configured to engage against a first surface of said movable band; and
   at least two guides configured to alternately engage said movable band.

5. The stacking apparatus of claim 4, wherein said first surface is an interior surface of said movable band, and wherein said at least two guides are configured to engage an exterior surface of said movable band.

6. The stacking apparatus of claim 1, wherein said twin roller comprises:
   at least two substantially identical portions configured to engage against a first surface of said movable band, wherein said first and second portions are both configured to engage an exterior surface of said movable band.

7. The stacking apparatus of claim 1, wherein said movable band is configured to orbit around said orbital path and to rotate around said at least two orbiting members on an interior surface of said movable band and which also orbit around said orbital path.

8. The stacking apparatus of claim 1, wherein said at least two orbiting members include two interior rollers that orbit along said orbital path, and wherein as said two interior rollers orbit along said orbital path, said twin roller and said band perform a rotational swap.

9. A stacking apparatus, comprising:
a roller set having at least first and second portions;
a band alternatingly passing against said first portion and said second portion of said roller set; and
a mechanism for causing said band to orbit along a path, said mechanism including a first roller and a second roller configured to orbit along said path, wherein said mechanism is arranged to cause said band to receive a stackable item and to move said stackable item to a predetermined location, wherein at said predetermined location, said band releases said stackable item by continuing to orbit along said path, but with approximately zero total velocity, wherein:
at a first position in which said first roller and said second roller are both on a same side of said roller set, said roller set is substantially stationary relative to its center; and
at a second position in which said first roller and said second roller are on opposite sides of said roller set, said band at least partially causes said roller set to collectively rotate.

10. The stacking apparatus of claim 9, wherein at said predetermined location, said band has a rotation that is essentially negated by its orbital movement.

11. The stacking apparatus of claim 9, wherein said first roller and said second roller engage said band and facilitate at least said orbit of said band along said path.

12. The stacking apparatus of claim 11, wherein said first roller and said second roller are disposed inside said band.

13. The stacking apparatus of claim 9, wherein said band has an exterior surface engaging at least a portion of said roller set.

14. The stacking apparatus of claim 13, wherein said exterior surface of said band engages one or more guides of said roller set.

15. The stacking apparatus of claim 9, wherein collective rotation of said roller set causes said band to alternatingly pass against said first portion and said second portion of said roller set.

16. A stacking apparatus, comprising:
two interior rollers;
a selectively rotating twin roller, separate from said two interior rollers, and having at least a first portion and a second portion;
a drive mechanism coupled to said two interior rollers, wherein said drive mechanism is configured to cause said two interior rollers to follow an orbital path; and
an endless band wrapped around said two interior rollers, and passing through said twin roller, such that said two interior rollers are internal relative to said endless band and are each engaged against an interior surface of said endless band, and such that said twin-roller is at least partially external relative to said endless band and is at least partially engaged against an exterior surface of said endless band, wherein said exterior surface of said band is adapted to receive one or more stackable items on a portion thereof,
wherein said orbit of said two interior rollers causes said endless band to follow approximately along said orbital path, and wherein said endless band is further configured such that when said endless band follows along said orbital path, said one or more stackable items are deposited onto a stack of stackable items, and wherein said portion of said external surface on which said one or more stackable items are received is configured to have approximately zero velocity as said one or more stackable items are deposited onto said stack.

17. The stacking apparatus of claim 16, wherein said first portion is configured to orbit around a center of said rotating twin roller, and said second half is configured to orbit around a center of said rotating twin roller.

18. The stacking apparatus of claim 16, wherein said first and second portions are configured to alternately engage said endless band.

19. The stacking apparatus of claim 16, wherein said first portion includes a first guide and said second portion includes a second guide, and wherein each of said first and second guides are sometimes engaged with said endless band, and wherein at some positions along said orbital path, said band engages only said first guide and not said second guide.

20. A stacking apparatus, comprising:
a drive mechanism;
a movable band connected to said drive mechanism, wherein said movable band is configured to be moved by said drive mechanism along an orbital path; and
a twin roller having first and second portions, wherein said first and second portions are configured to engage against said movable band and to fold said movable band into at least two band portions, wherein said twin roller comprises:
at least two rotating rollers configured to engage against a first surface of said movable band; and
at least two guides configured to alternately engage said movable band.

21. The stacking apparatus of claim 20, wherein said first surface is an interior surface of said movable band, and wherein said at least two guides are configured to engage an exterior surface of said movable band.

* * * * *